United States Patent Office.

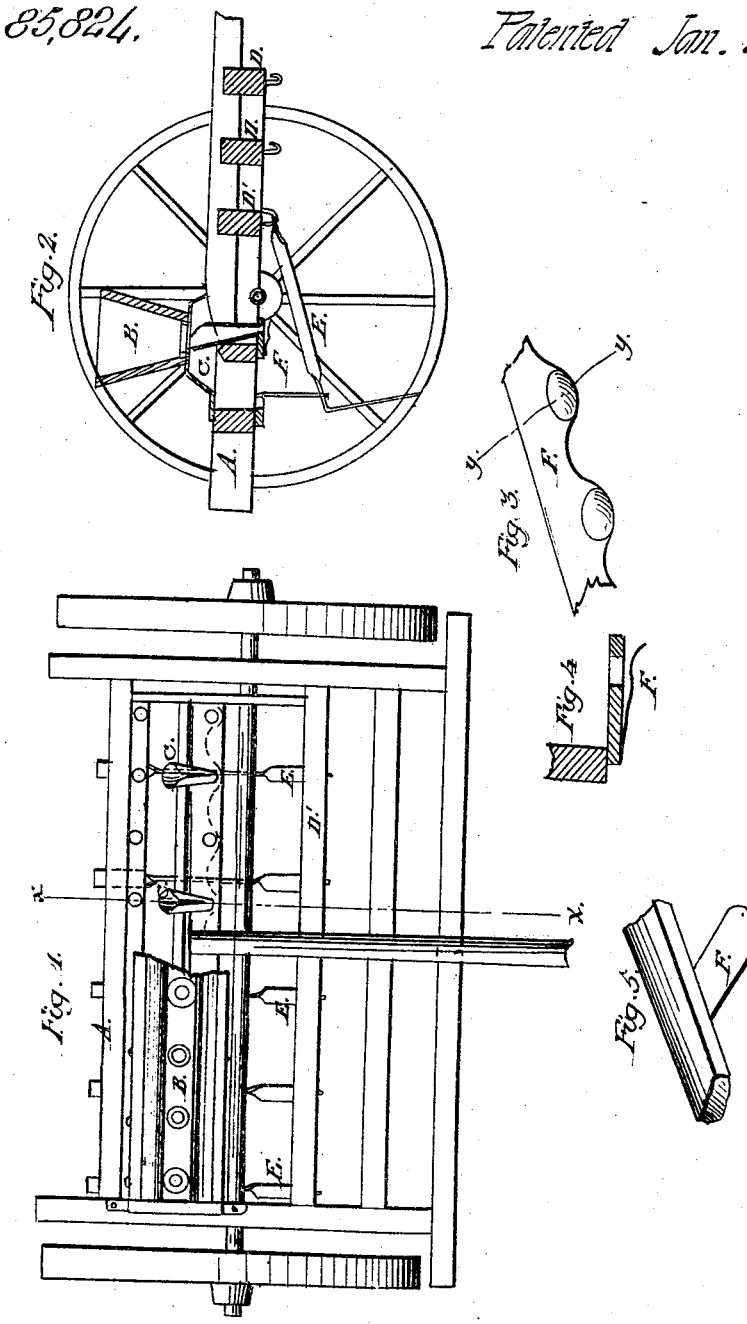

P. F. HODGES, OF ST. PAUL, MINNESOTA.

Letters Patent No. 85,824, dated January 12, 1869.

IMPROVEMENT IN GRAIN-DRILLS.

The Schedule referred to in these Letters Patent and making part of the same.

*To all whom it may concern:*

Be it known that I, P. F. HODGES, of St. Paul, in the county of Ramsey, and State of Minnesota, have invented a new and useful Improvement in Grain-Drills; and I do hereby declare that the following is a full, clear, and exact description of the same, reference being had to the annexed drawings, making part of this specification, in which—

Figure 1 is a top view of a grain-drill, with a portion of the seed-box broken away so as to show my improvement in connection therewith;

Figure 2 is a sectional elevation on line $x-x$ of fig. 1, showing the additional cross-bar for securing the hoes in position when the broadest sower is used;

Figure 3 is a detail view of a portion of the seed-distributer;

Figure 4 is a side elevation of the seed-distributer, on the line $y-y$ of fig. 3; and Figure 5 is a perspective view of a seed-distributer, showing how they are made separate and secured to the cross-bar of the drill.

The same letters in all the figures are used to indicate identical parts.

This invention relates to an improvement in grain-drills; and

It consists in combining with such drills a device for sowing grain broadcast; and also an arrangement of such device with reference to the seed-box; and further, in an arrangement of cross-bars for securing the hoes in such a manner that they may cover the grain when thus sown, as will be more fully described hereinafter.

A, in the drawings, represents a seed-drill, which may be of any approved construction, but which, as it forms no part of my present invention, need not be particularly described here, except in so far as it is necessary to show the relation which my present invention sustains thereto.

B is a seed-box, which occupies the position usually assigned to such devices.

C is the conductor, which directs the grain from the seed-box to the hollow hoes in an ordinary grain-drill, but which in this case directs such grain upon the plate F, hereafter to be described.

D D are beams, which extend transversely across the frame of the machine, and which are provided upon their under sides with hooks, to which to attach the hoes for covering the grain.

D' represents a cross-bar, arranged, with reference to the seed-box, in such a manner that the hoes may be placed in the rear of the broadcast-plate F, so as to cover the grain as it falls from such plate.

E E represent the hoes, the arrangement of which is clearly shown in fig. 2 of the drawings.

F is a distributing-plate, which is corrugated upon its distributing-edge, as clearly shown in figs. 3 and 4 of the drawings. This distributing or scattering-plate is to be attached to the bottom board of the machine, so that the oval or rounded surfaces thereof will come under the tubes which conduct the grain from the seed-box, as a consequence of which arrangement, the grain will fall upon such surfaces, and by them be deflected or scattered in such directions as to constitute what is termed "broadcast sowing."

In fig. 5 is shown a deflector, which is made in sections, or which may be so made and secured to the bottom board of the machine, directly under the seed-tubes. This distributer may be made of cast or sheet-metal, or of any other suitable material.

To prepare the ordinary grain-drill for the reception of my improvements, it is only necessary to remove the tubes that conduct the grain into the hollow hoes of the drill, and arrange the tubes between the seed-box and the bottom board of the drill in a single row, forward of the seed-box, and then remove the drag-bars of the front rank of hoes backward to the cross-bar, which is arranged for that purpose.

By the above-indicated arrangement, the hoes are removed out of the way of the falling grain, which will be sown broadcast among the drag-bars, as a consequence of which it will be still further scattered, owing to the lateral motion which these bars will always have while passing through the earth, and it will finally fall to the ground in front of the hoes, which will cultivate it or cover it with earth.

I do not claim broadly the conversion of a seed or grain-drill into a broadcast sower, as I am aware that has been done previous to the date of my invention; but having thus fully described my invention, What I do claim, and desire to secure by Letters Patent, is—

1. The combination of the scattering or distributing-plate, or its equivalent, with a grain-drill, for the purpose of sowing the grain broadcast, substantially as shown and described.

2. Arranging the distributing-plate under the bottom board of the drill, and over the drag-bars, substantially as shown.

3. The arrangement of the cross-beam D', as and for the purpose described.

4. The within-described construction of the seed-distributers, with their corrugated or rounded surfaces, substantially as shown and described.

In testimony whereof, I have signed my name to this specification, in the presence of two subscribing witnesses.

P. F. HODGES.

Witnesses:
L. A. TENNEY,
JAS. B. CRAIGHEAD.